United States Patent
Chioua et al.

(10) Patent No.: US 11,339,763 B2
(45) Date of Patent: May 24, 2022

(54) METHOD FOR WINDMILL FARM MONITORING

(71) Applicant: Hitachi Energy Switzerland AG, Baden (CH)

(72) Inventors: Moncef Chioua, Heidelberg (DE); Ni Ya Chen, Beijing (CN); RongRong Yu, Beijing (CN); Yingya Zhou, Shanghai (CN); Yao Chen, Beijing (CN)

(73) Assignee: Hitachi Energy Switzerland AG, Baden (CH)

( * ) Notice: Subject to any disclaimer, the term of this patent is extended or adjusted under 35 U.S.C. 154(b) by 584 days.

(21) Appl. No.: 15/828,450

(22) Filed: Dec. 1, 2017

(65) Prior Publication Data
US 2018/0087489 A1 Mar. 29, 2018

Related U.S. Application Data

(63) Continuation of application No. PCT/EP2015/062389, filed on Jun. 3, 2015.

(51) Int. Cl.
*G06G 7/48* (2006.01)
*F03D 17/00* (2016.01)
*G06F 11/30* (2006.01)

(52) U.S. Cl.
CPC .............. *F03D 17/00* (2016.05); *G06F 11/30* (2013.01); *F05B 2240/96* (2013.01); *Y02B 10/30* (2013.01)

(58) Field of Classification Search
CPC .................................. F03D 17/00; G06F 11/30
(Continued)

(56) References Cited

U.S. PATENT DOCUMENTS

2011/0270577 A1  11/2011  Mihok et al.
2012/0316689 A1*  12/2012  Boardman .......... H02J 13/0079
                                                              700/292
(Continued)

FOREIGN PATENT DOCUMENTS

WO     WO 2009016020 A1    2/2009

OTHER PUBLICATIONS

Zhang et al. (Wind turbine fault detection based on SCADA data analysis using ANN, 10 pages). (Year: 2014).*
(Continued)

*Primary Examiner* — Andre Pierre Louis
(74) *Attorney, Agent, or Firm* — Slater Matsil, LLP

(57) ABSTRACT

A method for monitoring turbines of a windmill farm includes: providing a global nominal dataset containing frame data of the turbines of the windmill farm and continuous reference monitoring data of the turbines for a first period in a fault free state, the reference monitoring data including at least two same monitoring variables for each turbine; building a nominal global model based on the global nominal dataset which describes the relationship in between the windmill turbines and clustering the turbines according thereto; assigning the data of the global nominal dataset to respective nominal local datasets according to the clustering; and building a nominal local model for the turbines of each cluster based on the respective assigned nominal local datasets, the nominal local model being built such that a nonconformity index is providable which indicates a degree of nonconformity between data projected on the local model and the model itself.

20 Claims, 12 Drawing Sheets

(58) Field of Classification Search
USPC .................................................. 703/6, 18
See application file for complete search history.

(56) References Cited

U.S. PATENT DOCUMENTS

| | | | |
|---|---|---|---|
| 2013/0073223 A1 | 3/2013 | Lapira et al. | |
| 2013/0314694 A1* | 11/2013 | Tchoryk, Jr. ........... | G01N 21/45 356/28.5 |
| 2015/0339570 A1* | 11/2015 | Scheffler ................. | G06N 3/04 706/16 |

OTHER PUBLICATIONS

Kim et al. (A Three Dimensional Clustering in Wind Farms with Storage for Reliability Analysis, 6 pages (Year: 2013).*

Kim Hagkwen et al.: "Three dimensional clustering in wind farms with storage for reliability analysis", 2013 IEEE Grenoble Conference, IEEE, Jun. 16, 2013 (Jun. 16, 2013), pp. 1-6, XP032519762.

* cited by examiner

METHOD FOR WINDMILL FARM MONITORING

CROSS-REFERENCE TO PRIOR APPLICATIONS

This application is a continuation application of International Application No. PCT/EP2015/062389, filed on Jun. 3, 2015. The entire disclosure of that application is hereby incorporated by reference herein.

FIELD

The invention is related to a method for monitoring turbines of a windmill farm. It is known, that Wind energy is currently the fastest growing source of electric generation in the world. Operation and maintenance, including scheduled and unscheduled maintenance typically amounts 20% to 25% of the total windmill farm project effort. Continuously monitoring the condition of windmill turbines is seen as the most efficient way to reduce maintenance effort of windmill turbines in that continuous monitoring with integrated fault detection allow for early warnings of mechanical and electrical faults to avoid unscheduled maintenance and unnecessary scheduled maintenance.

BACKGROUND

Typically a Condition Monitoring System (CMS) is foreseen to evaluate the condition of the components in a system such as a windmill turbine. Fault detection is a Boolean decision about the existence of faults in a system. The goal of a fault diagnosis is the determination of the exact location and magnitude of a fault. To date, several windmill turbine CMSs are available on the market and many windmill turbine condition monitoring schemes have been proposed in literature. These schemes can be classified according to three aspects:

CMS can be implemented for a single component, a single turbine or a set of multiple turbines. While extensive investigations have been made in the area of single component monitoring such as e.g. gearbox monitoring and in the area of single windmill turbine monitoring according to its performance only few approaches exist in monitoring multiple turbines using a single model, in particular by obtaining positive results of monitoring multiple turbines by tracking their relationship, it could achieve fault detection but no fault diagnosis since it uses the measured power generation variable as the only variable monitored for each turbine and included in the model.

A model of windmill turbines and their components can be obtained based on physical laws, using neural networks or statistical data mining techniques. Modeling using statistical methods is often less costly than modeling based on physical laws and leads to an easier interpretability when compared to modeling using neural networks.

Windmill turbine data can be collected from Supervisory Control and Data Acquisition (SCADA) systems. SCADA systems are primarily used for operating and controlling windmill turbines. Windmill turbine data can be generated from additional installed sensors specifically designed for CMS. Using SCADA data for condition monitoring is motivated by the fact that data are readily collected, requiring therefore no additional equipment engineering, installation and testing.

Disadvantageously within the state of the art is that most of the available condition monitoring or fault diagnosis systems are focused a single windmill turbine, where the objective is to detect whether a fault happens in the turbine. Such a turbine focused approach is subject to a certain inaccuracy and also forthcoming faults are not easily to detect since only information which are directly related to the turbine are used for decision making.

SUMMARY

In an embodiment, the present invention provides a method for monitoring turbines of a windmill farm, comprising the following steps: providing a global nominal dataset containing frame data of the turbines of the windmill farm and continuous reference monitoring data of the turbines for a first period in a fault free state, the reference monitoring data comprising at least two same monitoring variables for each turbine; building a nominal global model based on the global nominal dataset which describes the relationship in between the windmill turbines and clustering the turbines according thereto; assigning the data of the global nominal dataset to respective nominal local datasets according to the clustering; building a nominal local model for the turbines of each cluster based on the respective assigned nominal local datasets, the nominal local model being built such that a nonconformity index is providable which indicates a degree of nonconformity between data projected on the local model and the model itself; providing a test dataset with continuous test monitoring data of the turbines of the windmill farm for a further period, those continuous test monitoring data being structured in a same way as the continuous reference monitoring data in the nominal global dataset, the clustering of the nominal global dataset being also applied on the test dataset; cluster wise projection of continuous test monitoring data of the test dataset on the respective assigned nominal local models of the turbines and deriving a nonconformity index for each respective turbine therefrom; and indicating a turbine as critical when the respective related nonconformity index exceeds a given limit.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
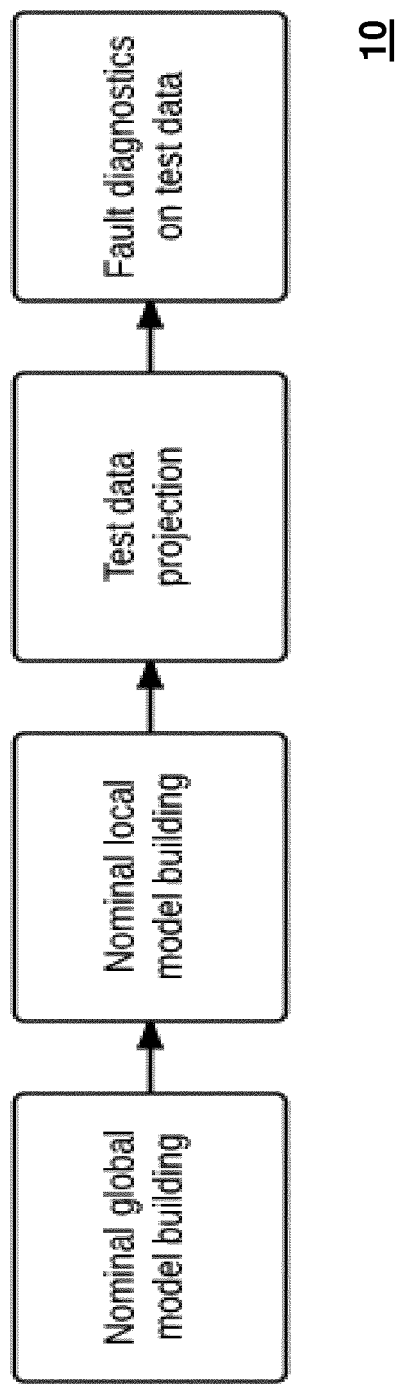
FIG. 1 shows the exemplary steps of the proposed workflow.

The problem is solved by a method for monitoring turbines of a windmill farm. This is characterized by the following steps:

providing a global nominal dataset containing frame data of the turbines (122, 124) of the windmill farm (120) and continuous reference monitoring data of the turbines (122, 124) for a first period in the fault free state, wherein the reference monitoring data comprise at least two same monitoring variables for each turbine (122, 124), building a nominal global model based on the global nominal dataset which describes the relationship inbetween the windmill turbines and clustering the turbines according thereto, assigning the data of the global nominal dataset to respective nominal local datasets according to the clustering, building a nominal local model for the turbines of each cluster based on the respective assigned nominal local datasets, wherein the nominal local model is built in that way, that a nonconformity index (NC) is providable which is indicating the degree of nonconformity between data projected on the local model and the model itself, providing a test dataset with continuous test monitoring data of the turbines of the windmill farm for a further period, wherein those continuous test monitoring data are structured in the same way than the continuous reference monitoring data in the nominal global dataset and wherein the clustering of the nominal global dataset is also applied on the test dataset, cluster wise projection of continuous test monitoring data of the test dataset on the respective assigned nominal local models of the turbines and deriving a nonconformity index (NC) for each respective turbine therefrom, indicating a turbine as critical in case that the respective related nonconformity index exceeds a given limit.

Basic idea of the invention is to take a holistic view of the whole windmill farm and to use the similarity between the expected behaviors of a subset of windmill turbines to determine whether or not some windmill turbines exhibit abnormalities in their behavior.

The algorithm used to model the nominal global and/or local model respectively the relationship between windmill turbines can be but is not limited to multivariate statistical algorithms such as Principal Component Analysis, Linear Discriminant Analysis and Support Vector Machines, or artificial intelligence techniques such as neural network.

Depending on the type of algorithm used, one or more indices may be developed to indicate the degree of nonconformity (denoted NC index in the sequel) between data and model. The NC index together with its statistical confidence limit is used to check:

The similarity of windmill turbines in the same model;

The dissimilarity of one or several windmill turbine(s) to other turbines in the same model;

The nonconformity of one or several windmill turbine(s) during a given time interval of operation.

Historical operational data are preferably collected from SCADA system during periods where windmill turbines are fault-free and/or operate in acceptable conditions. These periods form a nominal operating condition dataset respectively the global nominal dataset that is used as a reference for monitoring the windmill farm.

Data collected during those periods when the condition of the windmill turbine is to be monitored and diagnosed is taken as base of the test dataset. Both nominal data and test data are organized in the same structure, recording the same variables of the same turbines in the same windmill farm but during different time periods. The dataset might be preferably in essence a three mode dataset comprising several process variables (index J) of several turbines (index I) measured along several time samples (index K).

The variables can be for example signals related to the operation of a windmill turbine, such as electrical measurements (e.g. generated electrical power, voltage, current, power factor . . . ), temperature measurements (e.g. nacelle temperature, electrical generator temperature . . . ) and motional measurements (e.g. blade speed, electrical generator speed . . . ) as well as measurements variables describing the ambient conditions (e.g. wind direction, wind speed and ambient temperature).

The described invention is related to a method to monitor windmill farm solely based on historical data readily available for example on a SCADA system. This is providing the following advantages:

Windmill turbines presenting abnormalities in their operation are directly determined. This information might be presented automatically to an operator so that his reaction time for starting counteraction is reduced in an advantageous way. Of course it is also possible to start counteractions automatically by the monitoring system itself Automatic root cause analysis in case of the occurrence of a windmill turbine abnormal operation situation is as well enabled as assisting an operator in root cause analysis.

Extensive high performance hardware and models are not required in an advantageous way, since the method of the invention is a purely data driven approach which is based on already existing data from SCADA systems for example.

According to a further embodiment of the invention the local model for the turbines of each cluster is based on multivariate statistical algorithms such as Principal Component Analysis, Linear Discriminant Analysis and Support Vector Machines or artificial intelligence techniques such as neural network. Such methods, in particular the statistical based methods, are easily implementable and applicable on an existing database.

According to a further embodiment of the invention the nominal local model for the turbines of each cluster is built iteratively, wherein the data of those turbines which are not matching into the local model are identified as outliers and removed from further consideration for the next iteration. Thus misleading data is eliminated and the building of a coherent nominal local model based on the remaining consistent data is enabled therewith.

According to a further embodiment of the invention the corresponding data of those turbines which have been removed as outliers from further consideration within the global nominal dataset are removed also from further consideration within the respective clustered test data set accordingly. It can be expected, that those data, which are not consistent within a fault free reference period are also not consistent within a monitoring period. Thus removing those data from consideration also from the test dataset will improve the accuracy of the confidence factor determined therefrom.

According to a further embodiment of the invention the at least two same monitoring variables for each turbine (122, 124) are:

electrical measurements (e.g. generated electrical power, voltage, current, power factor . . . ), temperature measurements (e.g. nacelle temperature, electrical generator temperature . . . ), motional measurements (e.g. blade speed, electrical generator speed . . . ) and/or measurements variables describing the ambient conditions (e.g. wind direction, wind speed and ambient temperature).

Those variables are easily to measure and in most cases available in an existing SCADA system anyhow.

According to a further embodiment of the invention the frame data of the turbines within the global nominal dataset comprise data about the spatial proximity each to each other and/or the type of the turbines. Those frame data are in important base for the nominal global model based on the global nominal dataset which describes the relationship inbetween the windmill turbines and clusters the turbines accordingly. Turbines which are located in a spatial proximity are subject to have a similar behavior since they probably are subject to similar force impact of the wind and windmill turbines of the same type might be subject to a similar behavior since they are identical or at least similar. Thus clustering of the windmill turbines is facilitated therewith.

Even the global model shows (if any) clusters of identical windmill turbines, the geographical location of each wind turbine is therefore not necessarily required, although this information could be used to validate the clustering. If one compares it to the geographical map of the windmill farm and finds that (some of) the clusters could be explained by the geographical proximity of the corresponding turbines, it is a good indicator that the obtained global model captures the spatial location related heterogeneity between the turbines operation.

According to a further embodiment of the invention the continuous reference monitoring data of the global nominal dataset and the continuous test monitoring data of the test dataset are in essence a respective three mode dataset comprising several process variables (index J) of several turbines (index I) along several time samples (index K). Thus the most important data are storable in a three dimensional array. Optionally respective flags could be foreseen, indicating for example the assignment of a turbine to a respective cluster or indicating the respective data as outlier to be removed from consideration.

According to a further embodiment of the invention the data of the global nominal dataset and/or the test dataset are collected and provided at least predominantly by a SCADA system. A SCADA system is typically foreseen in a windmill farm anyhow, so the collection of required data can be done therewith in an easy way.

According to another embodiment of the invention a computing device with a respective software program module running thereon is foreseen for automatically performing the steps of the method. A computing device can be for example an industrial PC with keyboard and monitor which is embedded in a SCADA system. Thus a fully automated monitoring and indicating of a critical turbine is enabled.

According to a further embodiment of the invention automatic fault analysis is initiated upon indicating a turbine as critical. Thus it is further automatically evaluated, whether a critical turbine is faulty respectively why it is indicated as critical so that respective counteractions can be initiated.

According to a further embodiment of the invention the automatic fault analysis comprises the following steps:

turbine level parsing,
time level parsing,
variable level parsing.

In the turbine level parsing it is determined, whether the nonconformity index (NC) of any turbine exceeds a certain limit so that the respective turbine is critical therewith. In subsequent step the time level parsing the history of the NC of the respective turbine is analyzed and the moment in that the NC exceeded the certain limit is determined. Afterwards it is analyzed variable by variable, whether there are irregularities at the moment determined in the step before. This variable is typically a base for identifying the root cause of a fault.

FIG. 1 shows the exemplary steps of the proposed workflow in a sketch 10. The steps of the workflow are:

Nominal global model building,
Nominal local model building,
Test data projection and
Fault diagnostics on test dataset.
Nominal global model building The data are collected from each windmill turbine measurement for all windmill turbines present in the windmill farm to be monitored. This data is first collected during a known fault-free time period of operation and is preprocessed to form a nominal global dataset. A global model is built using this global nominal dataset. This global nominal model captures the relationship between all the windmill turbines present in the windmill farm by statistical techniques during a fault-free time period of operation. In order to enhance the ability of the model to capture a deviation from nominal behavior of a given windmill turbine, clusters of similar windmill turbines are formed and the windmill turbines are divided into groups according to obtained the clustering pattern. The nominal global dataset is then accordingly divided into several nominal local datasets. If there is no clear clustering pattern or if the ability of the obtained global model to detect an abnormal turbine behavior is considered as accurate enough, the global nominal date set can also be used as a single nominal local dataset.

The relationship between turbines in each nominal local dataset is preferably modeled by the modeling algorithm described above, e.g. preferably multivariate statistical algorithms. Outliers are identified and removed from the nominal local dataset and the local model is then rebuilt. The outlier removal/local model building processes are iterated until no apparent outlier can be identified.

The test dataset includes the same variables collected for the same windmill turbines as the one used to build the nominal local dataset. For the test dataset, data are collected during the time period to be monitored and diagnosed. The test dataset is pre-processed in a similar way as done for the nominal dataset. The test dataset is projected on the nominal model. Projection here refers to the operation of comparing the test dataset with the nominal dataset by mean of using a NC index that quantifies the nonconformity of test dataset to the nominal local model generated from the nominal dataset. The NC index of the test dataset with respect to the nominal local model is evaluated at each data point.

The NC index values of the test dataset are parsed to provide the condition of all windmill turbines, fault detection, identification, isolation and process recovery. A fault here refers to a component failure or a performance degradation of a single windmill turbine.

Figure 2:
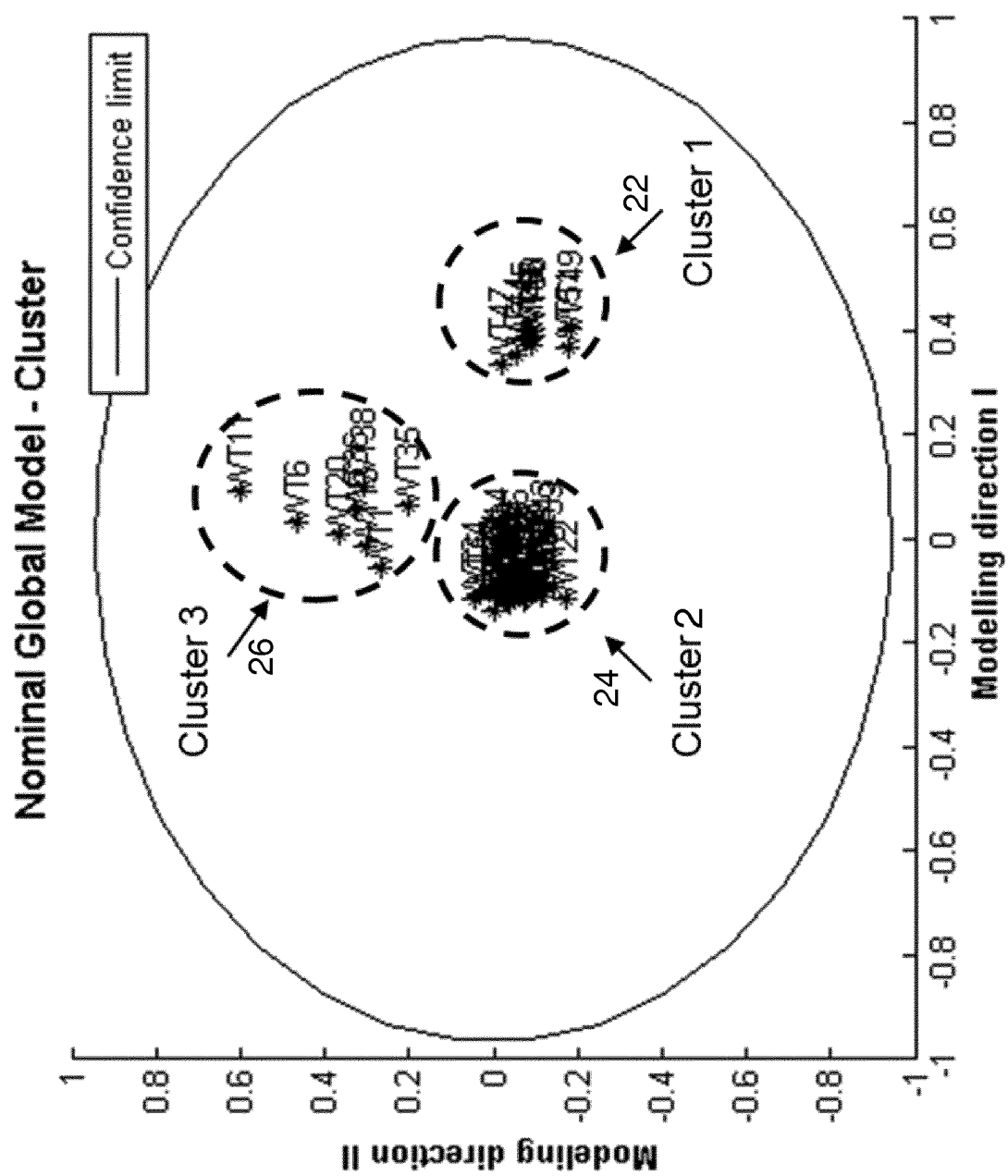
FIG. 2 shows an exemplary nominal global model cluster.

FIG. 2 shows an exemplary nominal global model cluster in a sketch 20. The model results might exhibit clusters of windmill turbines such as depicted in the sketch 20. The clustering pattern can be the result of e.g. the spatial proximity of windmill turbines leading to a similar wake effect affecting them and/or the fact that some windmill turbines are of the same type. To improve the accuracy of the model, windmill turbines can be divided into several groups according to the obtained clustering pattern. The dataset collected for each group of windmill turbines is used to build a nominal local model in the next step of the workflow. If no clear cluster is identified, the nominal global model is used as a local model in the next step of the workflow.

Figure 3:
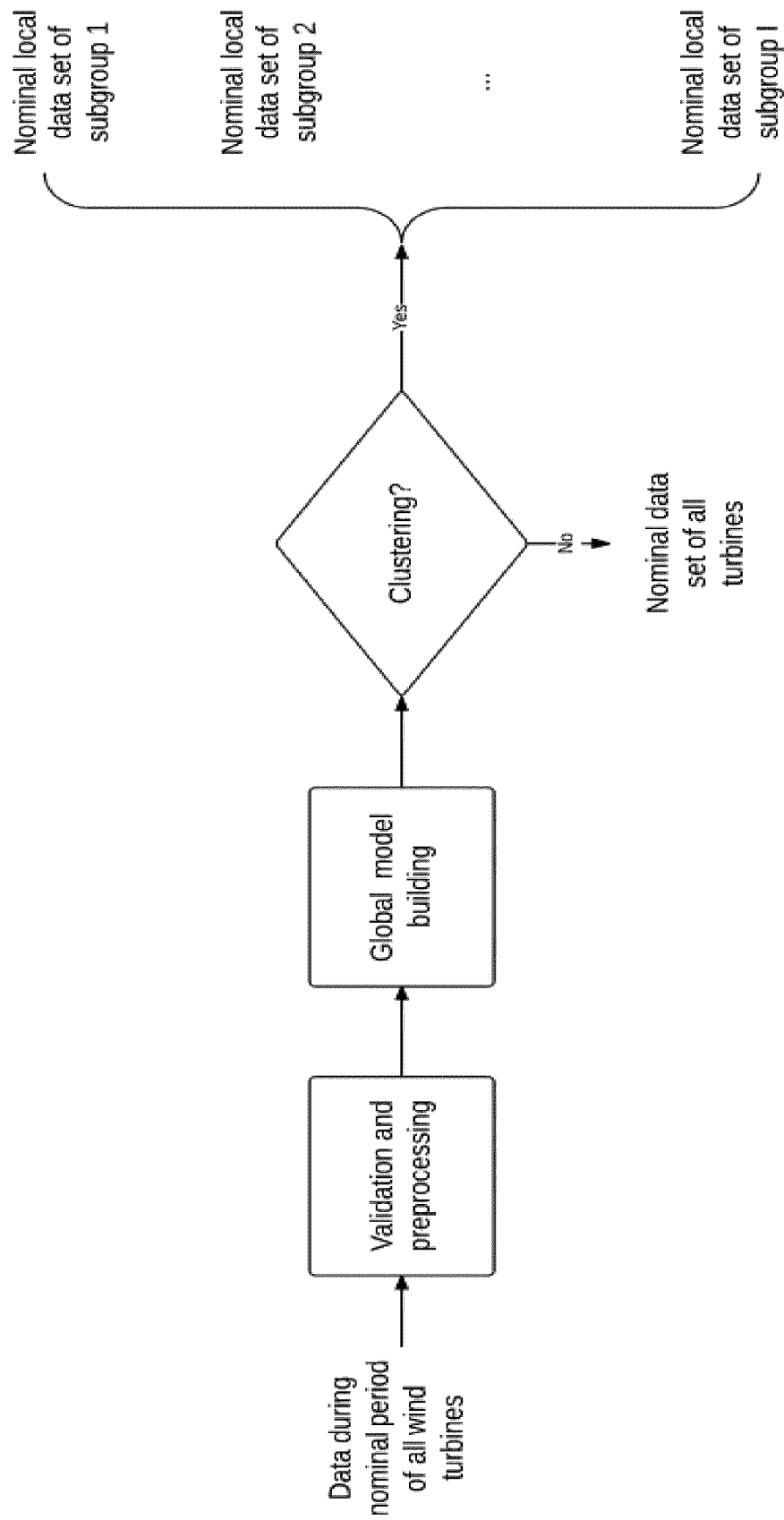
FIG. 3 shows an exemplary flow chart of the "nominal global model building" step.

FIG. 3 shows an exemplary flow chart of the "nominal global model building" step in a sketch 30. The nominal model building step includes the nominal dataset preprocessing, the global model building, the windmill turbines clusters identification and the local model building. The validity of the data is first verified in order to identify potential erroneous data. According to the results of the validation, erroneous data are removed. A global model is built using the validated and preprocessed nominal dataset to capture the relationship between the turbines. The term "global" refers here to the fact that a single model includes all the windmill turbines present in a given windmill farm.

Figure 4:
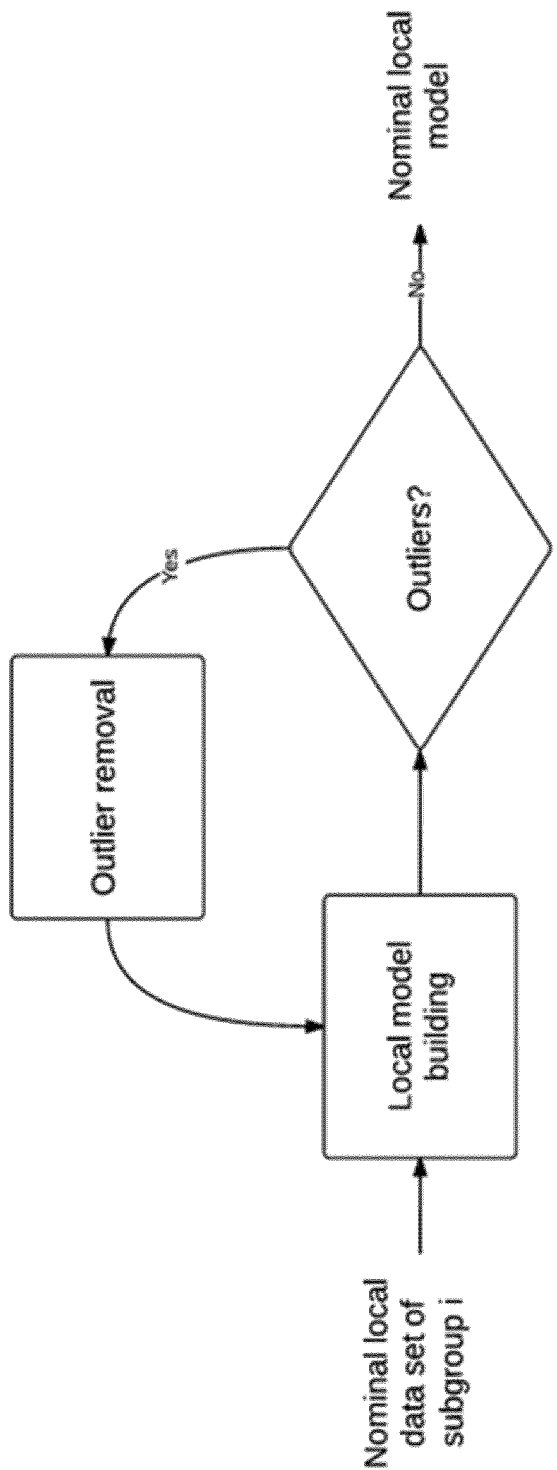
FIG. 4 shows an exemplary flow chart of the "nominal local model building" step.

FIG. 4 shows an exemplary flow chart of the "nominal local model building" step in a sketch 40. While the global model is built to identify groups of similar windmill turbines in a windmill farm, the local model is built to model the similarity of windmill turbines in the same group by means of the modeling algorithm. Outliers are identified based on the results of the obtained local model. A NC index and its confidence limit may be used to help identifying an outlier. The identified outlier is removed from the nominal local dataset and a new local model is built. The outlier identification/model building processes are iterated until no apparent outliers can be identified or until a set level of homogeneity among the windmill turbines in the group is reached. The nominal local model is used as a reference for the monitoring and fault diagnosis in the subsequent steps.

Figure 5:
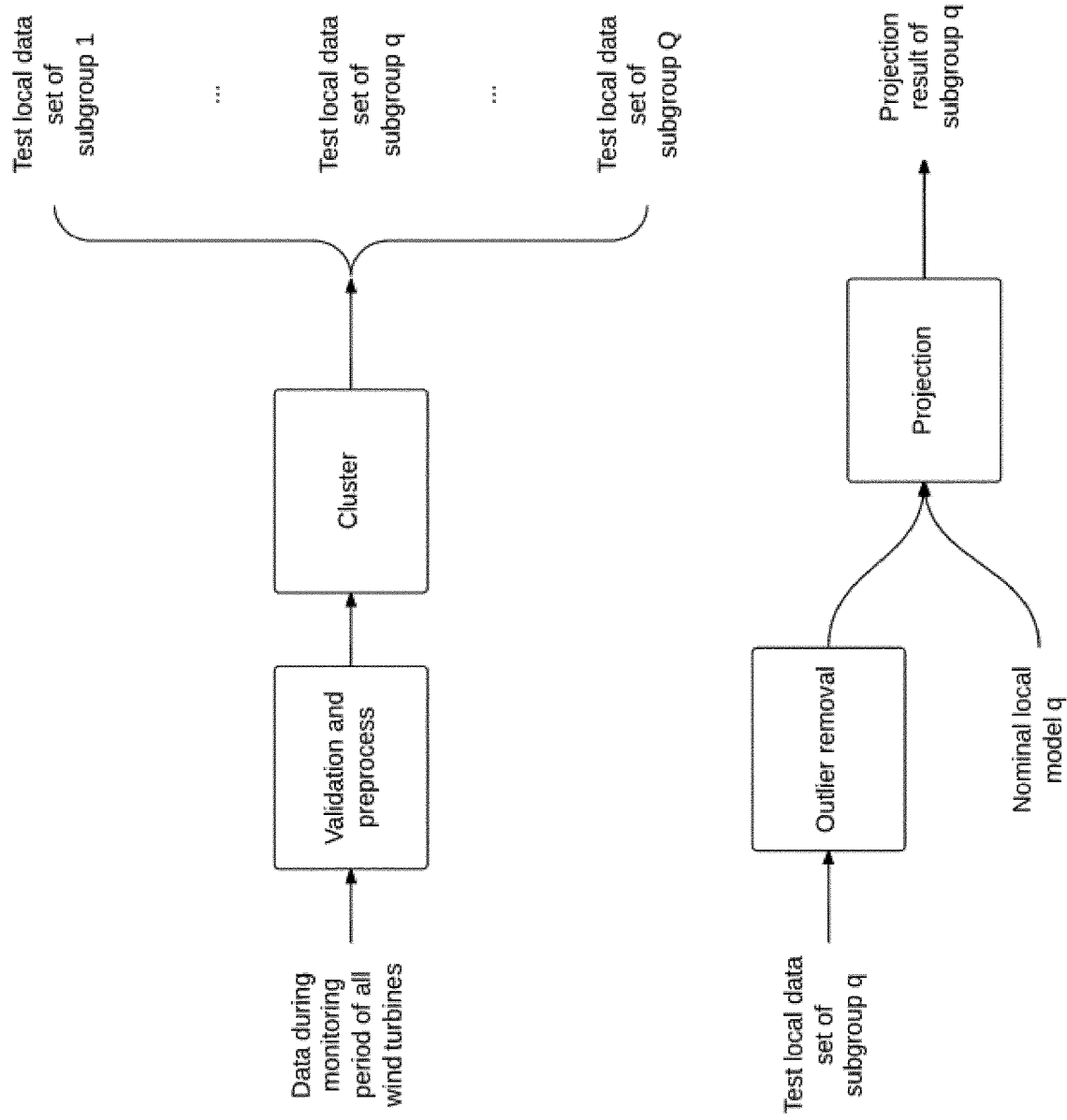
FIG. 5 shows an exemplary flow chart of the "test data projection" step.

FIG. 5 shows an exemplary flow chart of the "test data projection" step in a sketch 50. The test dataset includes the measurements of the same variables from the same windmill turbines present in the nominal dataset and measured during the monitoring period. The test dataset is divided into the same groups as the one used for the nominal dataset in Step 1. In each group the outliers identified in the nominal local dataset are removed from the test dataset so that the windmill turbines in each test local dataset are the same as in the corresponding nominal local dataset. As a result, the qth nominal local model can be used to diagnose the condition of the qth test local dataset by projecting the test local dataset on the nominal local model. Depending on the modeling algorithm, the realization of the projection operation can be different. The operation 'Projection' here means a conformity check between the windmill turbines characteristics captured by the nominal local model using the nominal local dataset and the characteristics of the turbines present in the test local dataset. The nonconformity is measured by the NC index at each data point of the ith windmill turbine, jth variable and kth time point. The qth test local dataset is then projected into the qth nominal local model. The NC index is evaluated for each variable of each turbine at each time point. The NC index is used for fault diagnostic in the next step.

Figure 6:
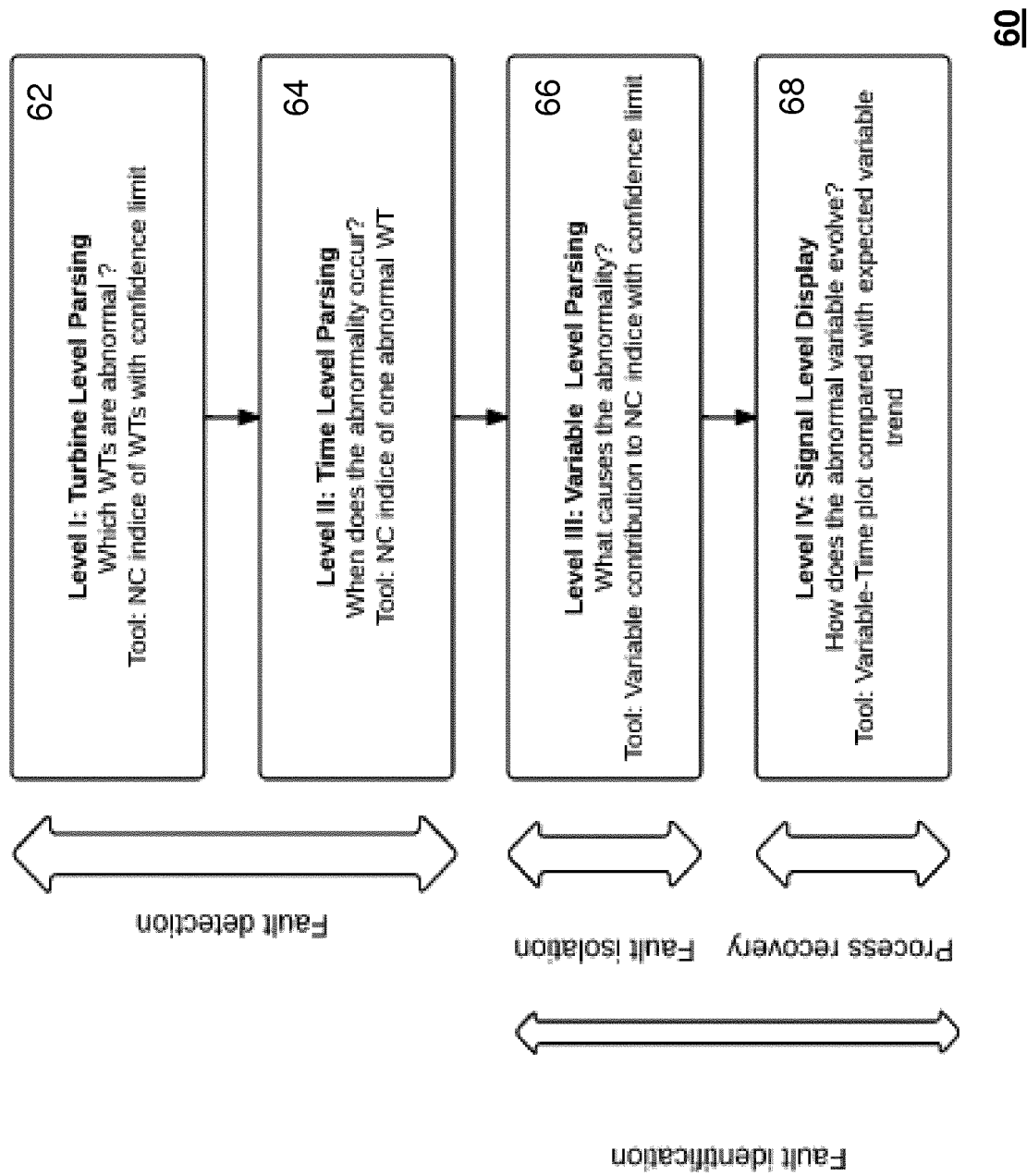
FIG. 6 shows an exemplary fault diagnostics on test monitoring data.

FIG. 6 shows an exemplary fault diagnostics on test monitoring data in a sketch 6. Fault diagnostics includes three tasks:
fault detection,
fault isolation and
fault identification.

When possible, fault diagnostics can also provide the user a support for a corrective action selection for a subsequent process recovery. The proposed method is an integrated method which achieves the four tasks using a single nominal model and parsing the NC indices level by level.

Figure 7:
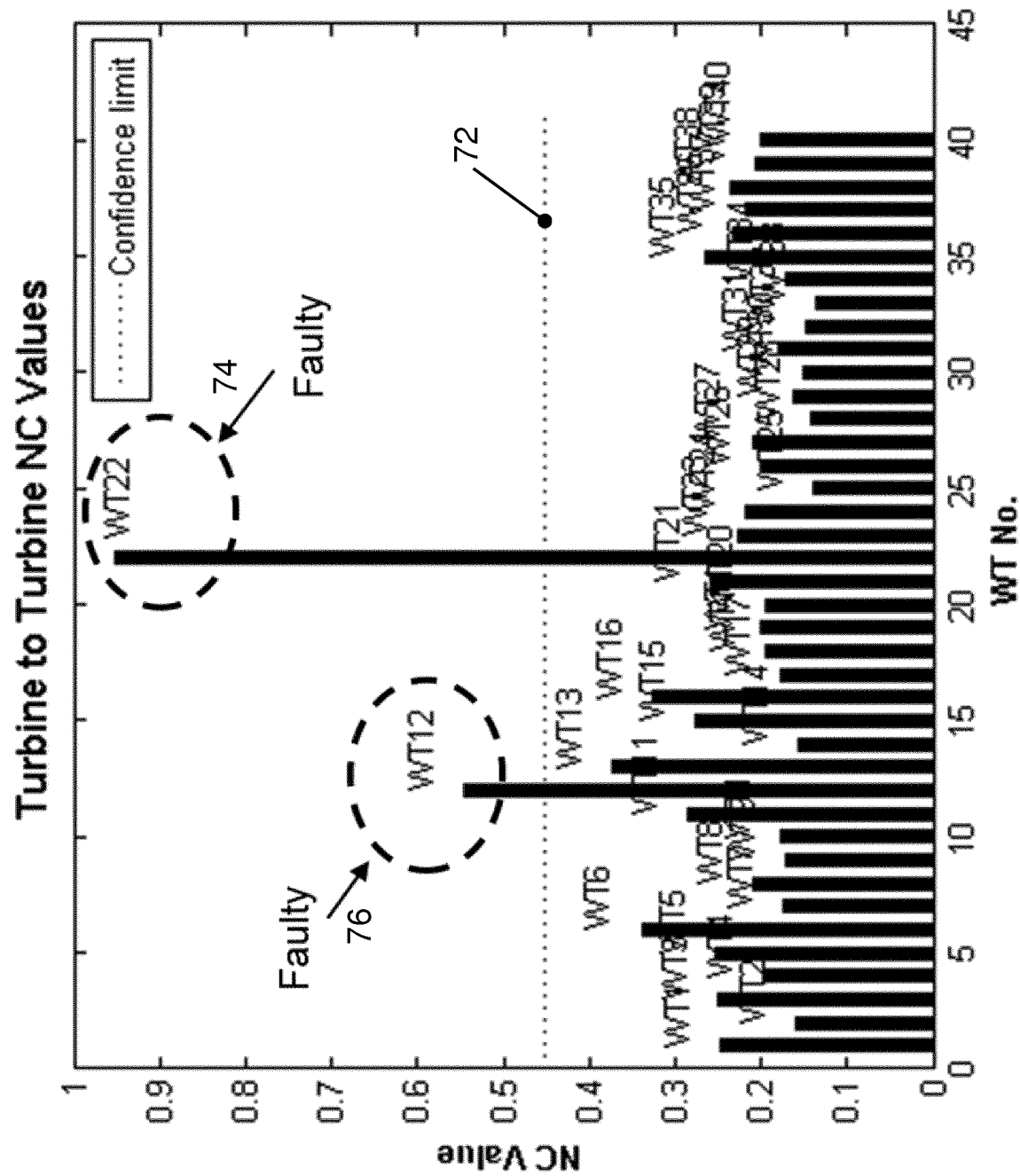
FIG. 7 shows an exemplary turbine level parsing (level I)

FIG. 7 shows an exemplary turbine level parsing (level I) in a sketch 70. In this level, the NC index is evaluated for each turbine over the duration of the test dataset. The NC indices computed for each windmill turbine are compared to each other and/or with the confidence limit, as shown in the sketch 80. Windmill turbines with higher NC values than the confidence limit are flagged as faulty. Each of the faulty windmill turbines is further analyzed in the next level.

Figure 8:
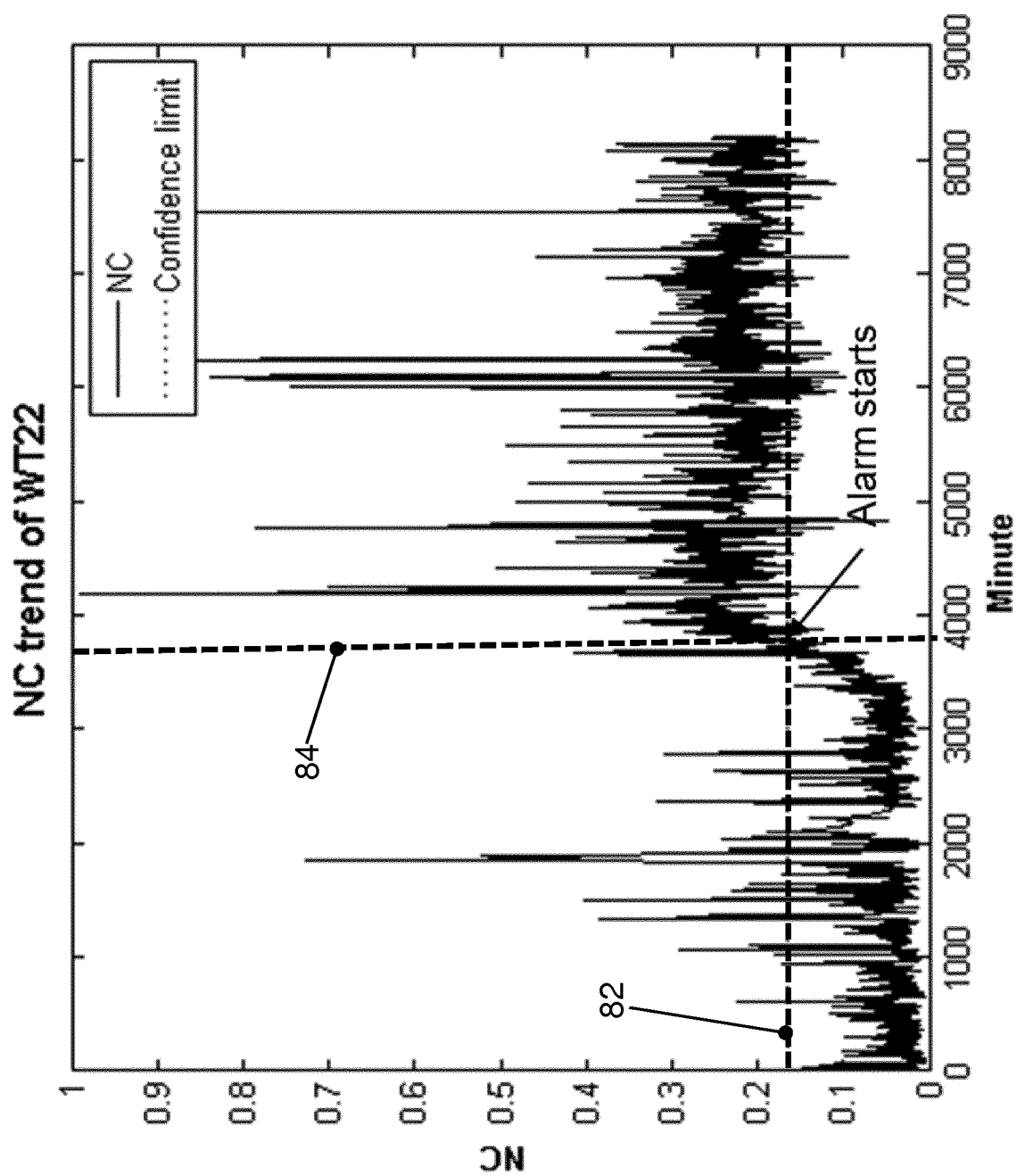
FIG. 8 shows an exemplary time level parsing (level II)

FIG. 8 shows an exemplary time level parsing (level II) in a sketch 80. In this level, the NC index evaluated for each faulty windmill turbine detected in level I is parsed along the time so that the time trend of the fault of the turbine can be analyzed. The time point or the time interval when the when the faulty windmill turbine should be flagged as faulty can be identified using a computed confidence limit.

Figure 9:
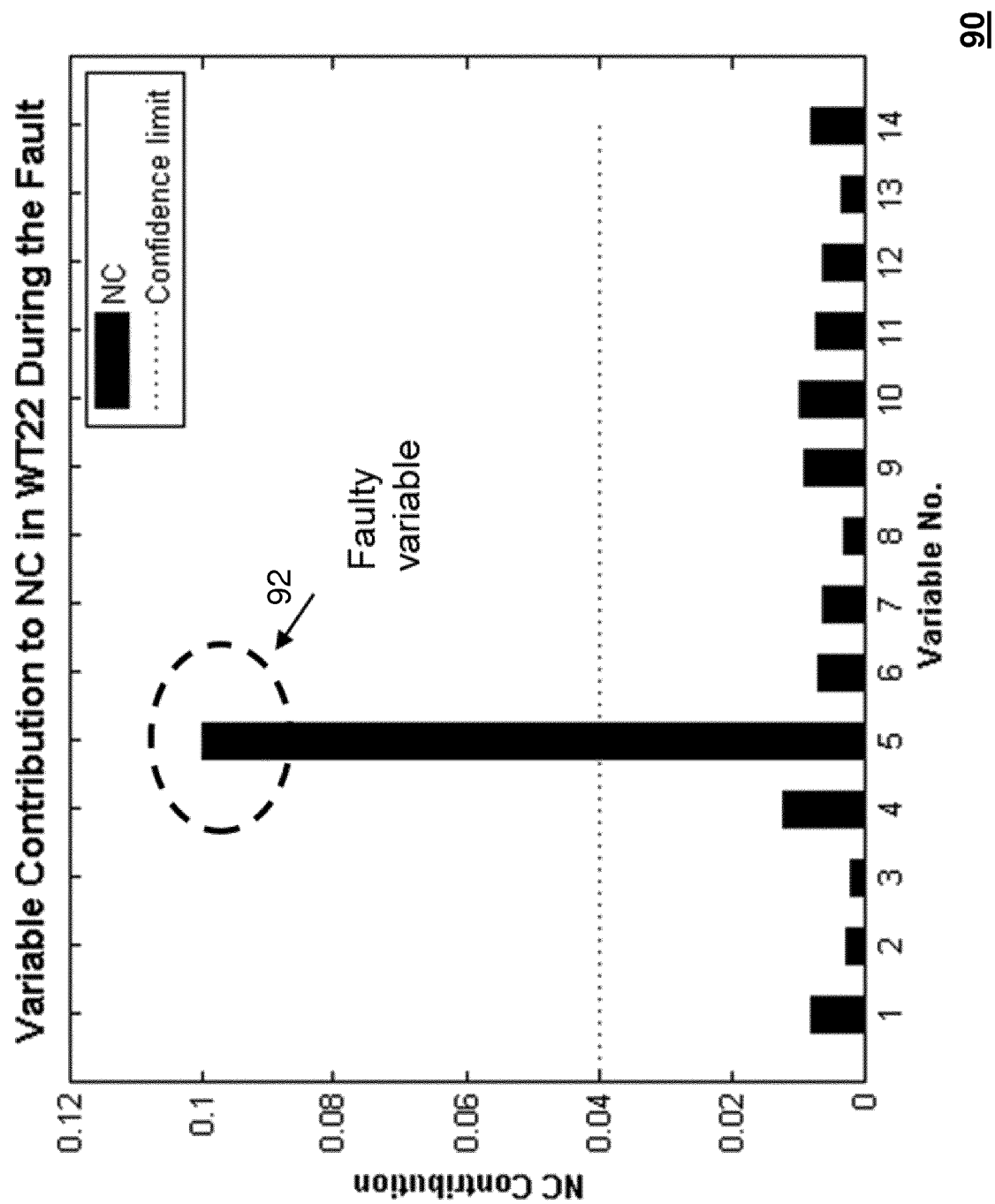
FIG. 9 shows an exemplary variable level parsing (level III): faulty variable isolation using statistical confidence limit.

FIG. 9 shows an exemplary variable level parsing (level III): faulty variable isolation using statistical confidence limit in a sketch 90. The NC index evaluated at the time when the turbine is flagged as faulty are then parsed over all the variables. The contribution of each variable to the total NC index value at this time point can be compared to a confidence limit as shown in the sketch 90.

Figure 10:
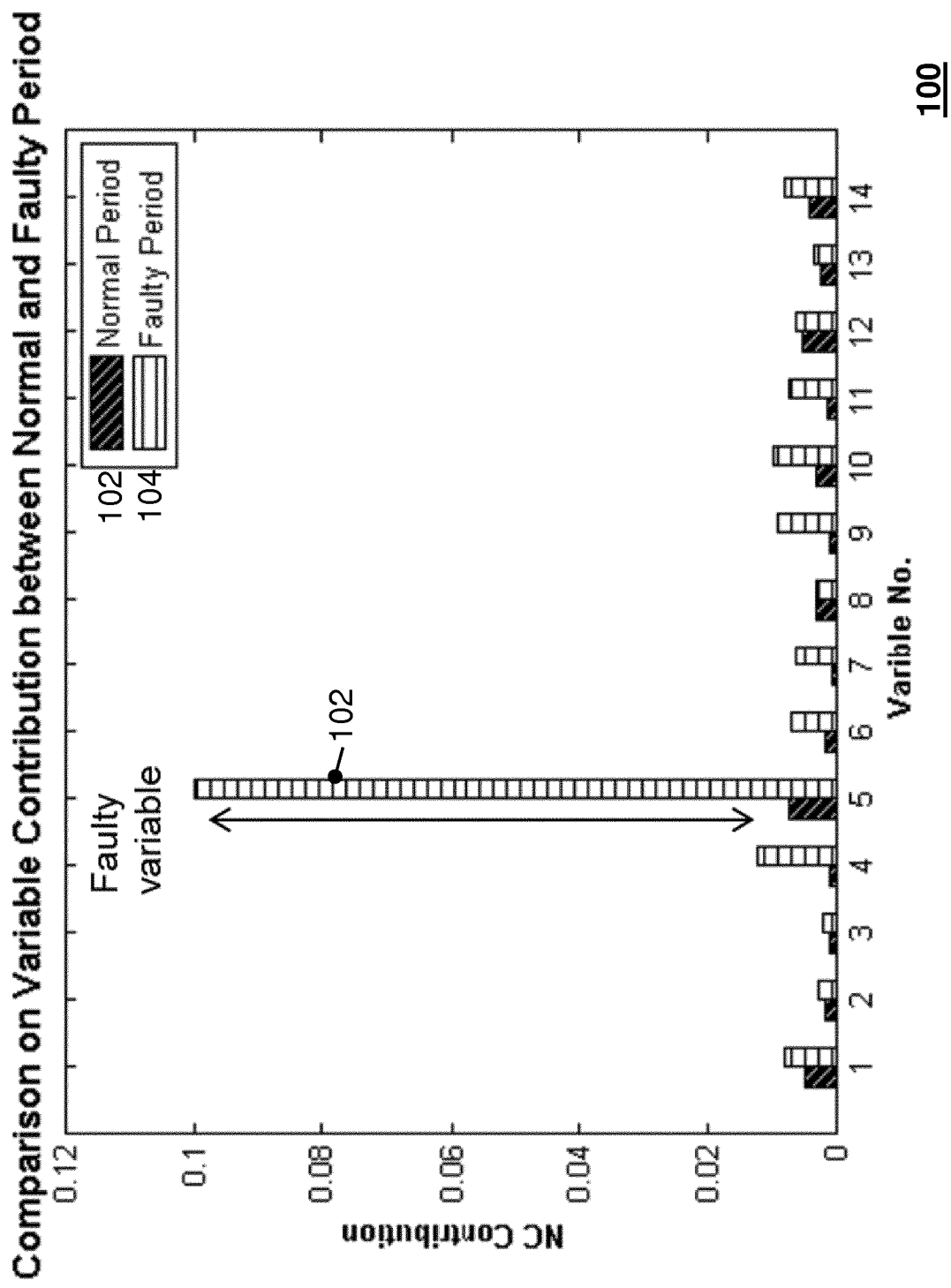
FIG. 10 shows an exemplary variable level parsing (level III): faulty variable isolation using comparison to contribution during nominal period.

FIG. 10 shows an exemplary variable level parsing (level III): faulty variable isolation using comparison to contribution during nominal period in a sketch 100. The comparison can also be made using a contribution plot computed using data collected when the turbine operates normally, the variables which are abnormally contributing to the sum of the NC index values can therefore be isolated.

Figure 11:
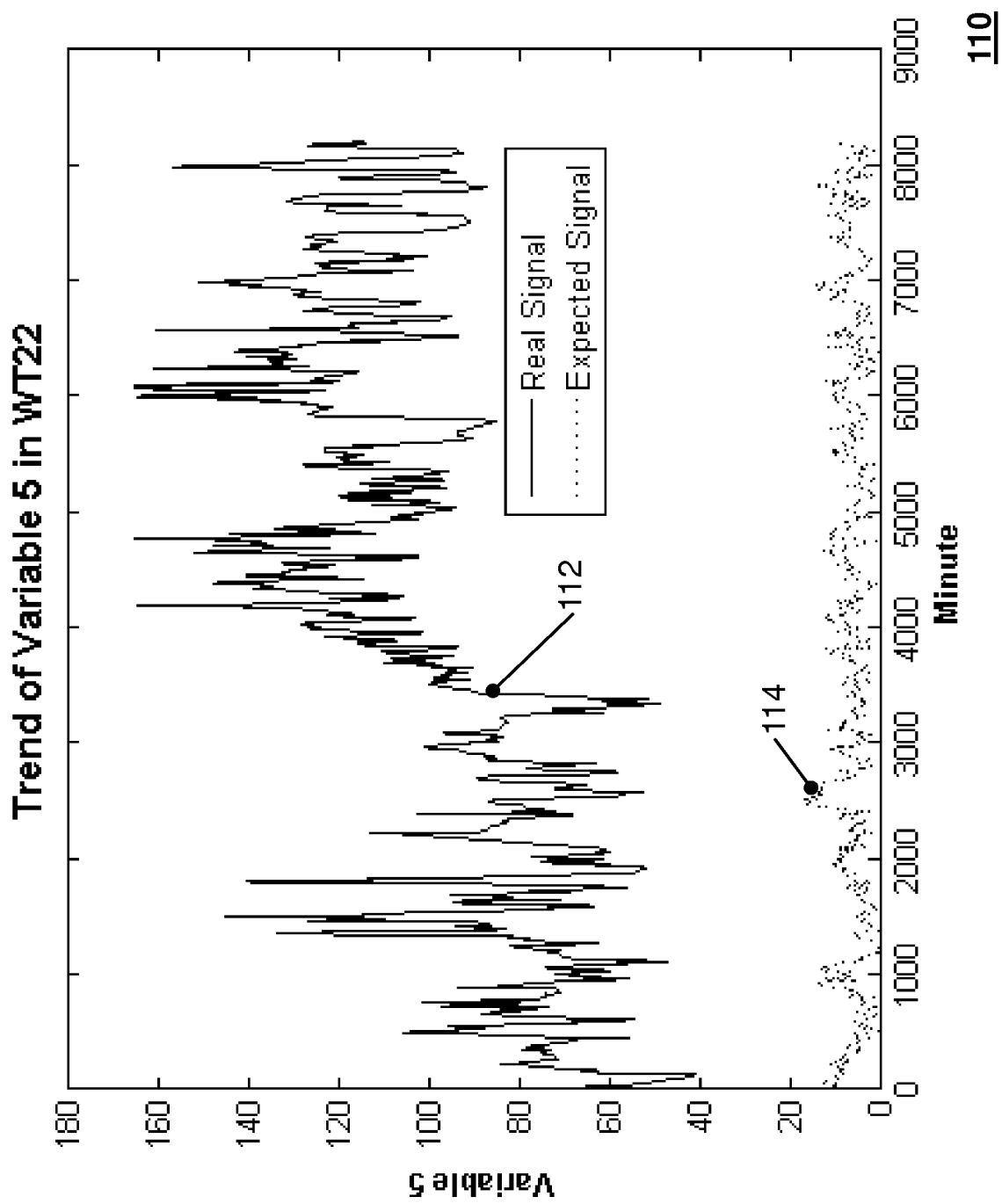
FIG. 11 shows an exemplary signal level display (level IV)

FIG. 11 shows an exemplary signal level display (level IV) in a sketch 1 10, Through level I to level III, the whole process of fault detection, fault identification and isolation (fault diagnosis) are achieved. The time trend of the isolated faulty variable^) of the faulty turbine(s) are plotted along the time together with the expected time trend of the same variable(s), i.e. the trend of this variable when it has a normal level of contribution to the NC index value can also be simulated and plotted against the actual variable time trend, as shown in sketch 1 10. The deviation between the two time trends also offers a direct and easily understandable visualization of the magnitude of the fault. Moreover, the control system can be automatically or manually adjusted based on the identified faulty component and the expected value of the variable so that a process recovery can be achieved.

Figure 12:
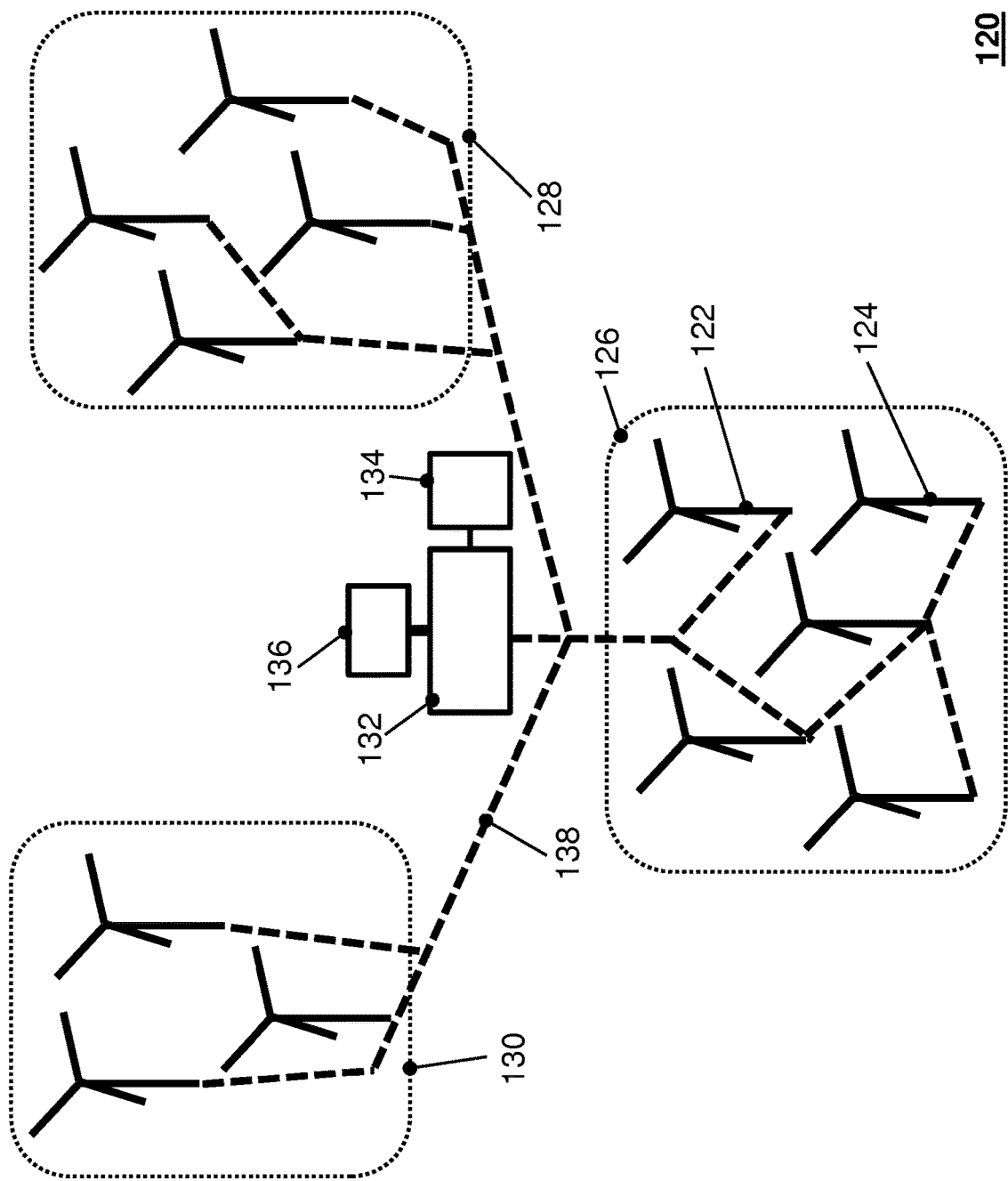
FIG. 12 shows a schematic representation of a method for monitoring turbines of a windmill farm.

FIG. 12 shows a schematic representation of a method for monitoring various clusters of turbines of a windmill farm, including first cluster 126, second cluster 128, and third cluster 130. First cluster 126 includes first turbine 122 and second turbine 124. Clusters 126, 128, 130 are connected to computing device with monitoring system 132, which is in turn connected to database with global nominal dataset 134 and display device 136.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 exemplary steps of the proposed workflow according to the invention
20 exemplary nominal global model cluster
22 first cluster
24 second cluster
26 third cluster
30 exemplary flow chart of the "nominal global model building" step
40 exemplary flow chart of the "nominal local model building" step
50 exemplary fault diagnostics on test monitoring data
60 exemplary fault diagnostics on test monitoring data
62 first step turbine level parsing
64 second step time level parsing
66 third step variable level parsing
68 fourth step signal level display
70 exemplary turbine level parsing (level I)
72 confidence limit of nonconformity index (NC)
74 first faulty turbine
76 second faulty turbine
80 exemplary time level parsing (level II)
82 confidence limit of nonconformity index (NC)
84 start of alarm
90 exemplary variable level parsing (level III): faulty variable isolation using statistical confidence limit
92 faulty variable
100 exemplary variable level parsing (level III): faulty variable isolation using comparison to contribution during nominal period
102 faulty variable
1 10 exemplary signal level display (level IV)
1 12 real signal
1 14 expected signal
120 exemplary windmill farm
122 first turbine of windmill farm
124 second turbine of windmill farm
126 first cluster of windmill farm
128 second cluster of windmill farm
130 third cluster of windmill farm
132 computing device with monitoring system
134 database with global nominal dataset
136 display device

What is claimed is:

1. A method for monitoring turbines of a windmill farm, the method comprising:
providing a global nominal dataset containing frame data of the turbines of the windmill farm and continuous reference monitoring data of the turbines for a first period in a fault free state, the reference monitoring data comprising at least two same monitoring variables for each turbine;
building a nominal global model based on the global nominal dataset and relationships between the windmill turbines present in the windmill farm by statistical techniques during a fault-free time period, and clustering the turbines according thereto;
assigning the data of the global nominal dataset to respective nominal local datasets according to the clustering;
building a nominal local model for the turbines of each cluster based on the respective nominal local datasets and based on multivariate statistical algorithms or artificial intelligence techniques, wherein the nominal local model is built in that way, that a nonconformity index (NC) is providable which is indicating a degree of nonconformity between data and the model;
providing a test dataset with continuous test monitoring data of the turbines of the windmill farm for a further period, wherein those continuous test monitoring data are structured in the same way than the continuous reference monitoring data in the nominal global dataset and wherein the clustering of the nominal global dataset is also applied on the test dataset;
cluster wise projection of continuous test monitoring data of the test dataset on the respective assigned nominal local models of the turbines and deriving a nonconformity index (NC) for each respective turbine therefrom; and
indicating a first turbine as critical in case that the respective related nonconformity index exceeds a given limit.

2. The method for monitoring turbines of a windmill farm of claim 1, wherein the nominal local model is based on Principal Component Analysis, Linear Discriminant Analysis, Support Vector Machines, or artificial intelligence techniques.

3. The method for monitoring turbines of a windmill farm of claim 1, further comprising refining the nominal local model during one or more iterations, each iteration comprising:
identifying one or more turbines of the cluster of turbines as outliers; and
rebuilding the nominal local model without data collected from the one or more turbines of the cluster of turbines identified as outliers.

4. The method for monitoring turbines of a windmill farm of claim 3, wherein data collected from the one or more turbines of the cluster of turbines identified as outliers is removed from the subset of the global nominal dataset during each iteration.

5. The method for monitoring turbines of a windmill farm of claim 1, wherein the global nominal dataset comprises data for each turbine of the turbines of the windmill farm comprising electrical measurements, temperature measurements, motional measurements, or ambient condition measurements.

6. The method for monitoring turbines of a windmill farm of claim 1, wherein the global nominal dataset comprises data about a type of each turbine of the turbines of the windmill farm or a spatial proximity of each turbine of the turbines of the windmill farm to each other turbine of the turbines of the windmill farm.

7. The method for monitoring turbines of a windmill farm of claim 1, wherein each of the global nominal dataset and the test dataset comprises a three mode dataset comprising several process variables (index J) of several turbines (index I) along several time samples (index K).

8. The method for monitoring turbines of a windmill farm of claim 1, wherein the global nominal dataset or the test dataset are collected at least predominantly by a SCADA system.

9. The method for monitoring turbines of a windmill farm of claim 1, further comprising a computing device with a respective software program module running on the computing device configured to automatically perform the method.

10. The method for monitoring turbines of a windmill farm of claim 1, wherein an automatic fault analysis is initiated upon identifying the first turbine as critical.

11. The method of claim 10, wherein the automatic fault analysis comprises:
turbine level parsing;
time level parsing; and
variable level parsing.

12. The method for monitoring turbines of a windmill farm of claim 2, wherein the artificial intelligence techniques comprise a neural network.

13. The method for monitoring turbines of a windmill farm of claim 5,
wherein the electrical measurements comprise generated electrical power measurements, voltage measurements, current measurements, or power factor measurements,
wherein the temperature measurements comprise nacelle temperature measurements or electrical generator temperature measurements,
wherein the motional measurements comprise blade speed measurements, or electrical generator speed measurements, or
wherein the ambient condition measurements comprise wind direction measurements, wind speed measurements, or ambient temperature measurements.

14. A method for monitoring turbines of a windmill farm, the method comprising:
collecting a global nominal dataset from a plurality of turbines of a windmill farm during a reference period that is determined to be fault free;
building a nominal global model based on the global nominal dataset and a plurality of relationships between the plurality of turbines present in the windmill farm by statistical techniques during a fault-free time period;
identifying a cluster of turbines from the plurality of turbines based on the nominal global model;
building a nominal local model for the cluster of turbines based on a subset of the global nominal dataset comprising data collected from the cluster of turbines during the reference period;
iteratively refining the nominal local model, each iteration comprising:
identifying an outlier turbine of the cluster of turbines as being an outlier based on results obtained from the nominal local model;
removing the outlier turbine from the cluster of turbines;
removing data collected from the outlier turbine from the subset of the global nominal dataset; and
rebuilding the nominal local model based on the subset of the global nominal dataset after removing data collected from the outlier turbine from the subset of the global nominal dataset;
collecting a test dataset from the cluster of turbines during an operational period of the windmill farm;
deriving a nonconformity index for each turbine of the cluster of turbines that measures conformity between the test dataset and the nominal local model; and
identifying a first turbine of the cluster of turbines as critical when the nonconformity index for the turbine of the cluster of turbines exceeds a given limit.

15. The method for monitoring turbines of a windmill farm of claim 14, wherein each of the global nominal dataset and the test dataset comprises a three mode dataset comprising several process variables (index J) of several turbines (index I) along several time samples (index K).

16. The method for monitoring turbines of a windmill farm of claim 14, wherein the global nominal dataset or the test dataset are collected at least predominantly by a SCADA system.

17. The method for monitoring turbines of a windmill farm of claim 14, further comprising continuing to refine the local nominal model until no outlier turbines can be identified in the cluster of turbines.

18. A method for determining a cluster of turbines of a windmill farm, the method comprising:
collecting a global nominal dataset from a plurality of turbines of a windmill farm during a reference period that is determined to be fault free;
building a nominal global model based on the global nominal dataset and a plurality of relationships between the plurality of turbines present in the windmill farm by statistical techniques during a fault-free time period;
identifying a cluster of turbines from the plurality of turbines based on the nominal global model;
building a nominal local model for the cluster of turbines based on a subset of the global nominal dataset comprising data collected from the cluster of turbines during the reference period; and
iteratively narrowing the cluster of turbines by:
identifying outlier turbines based on results obtained from the nominal local model,
removing outlier turbines from the cluster of turbines,
removing data collected from the outlier turbines during the reference period from the subset of the global nominal dataset, and
rebuilding the nominal local model based on the subset of the global nominal dataset after removing data collected from the outlier turbines from the subset of the global nominal dataset.

19. The method for determining a cluster of turbines of a windmill farm of claim 18, wherein the global nominal dataset is collected at least predominantly by a SCADA system.

20. The method for determining a cluster of turbines of a windmill farm of claim 18, wherein the global nominal dataset comprises data for each turbine of the plurality of turbines comprising electrical measurements, temperature measurements, motional measurements, or measurements describing ambient conditions.

* * * * *